United States Patent [19]

Nagatani

[11] 4,276,321

[45] Jun. 30, 1981

[54] METHOD OF PREPARING SHAPED RICE FOOD

[75] Inventor: Yoshio Nagatani, Tokyo, Japan

[73] Assignee: Nagatanien Honpo Co., Ltd., Tokyo, Japan

[21] Appl. No.: 963,102

[22] Filed: Nov. 22, 1978

Related U.S. Application Data

[63] Continuation of Ser. No. 826,997, Aug. 23, 1977, abandoned.

[30] Foreign Application Priority Data

Apr. 8, 1977 [JP] Japan .................................. 52/40056

[51] Int. Cl.³ ............................................... A23L 1/00
[52] U.S. Cl. ..................................... 426/618; 426/393; 426/412; 426/512
[58] Field of Search ................. 426/618, 412, 393, 512

[56] References Cited

U.S. PATENT DOCUMENTS 3,711,295  1/1973  Zukerman .......................... 426/618

FOREIGN PATENT DOCUMENTS 4639049  8/1967  Japan ..................................... 426/412
4629177  6/1968  Japan ..................................... 426/618

*Primary Examiner*—Joseph M. Golian
*Assistant Examiner*—Elizabeth A. Hatcher
*Attorney, Agent, or Firm*—Remy J. VanOphem

[57] ABSTRACT

A method of preparing a shaped rice food comprising the steps of wrapping a boiled rice pretreated to be substantially non-viscous in a heat-shrinkable film in a predetermined shape, and heating the wrapped rice, thereby softening and swelling the rice and shrinking the film so as to compress the swollen rice utilizing the shrinking force of the film. The boiled rice may be frozen before wrapped in the heat-shrinkable film. Shaped rice food of various tastes can be provided by this method.

1 Claim, No Drawings

METHOD OF PREPARING SHAPED RICE FOOD

This is a continuation of application Ser. No. 826,997 filed Aug. 23, 1977 and now abandoned.

BACKGROUND OF THE INVENTION

1. Field of the Invention

This invention relates to a method of preparing a shaped rice food including so-called "onigiri", and more particularly to a method of preparing a shaped rice food presenting various tastes and flavors which the conventional shaped rice food is unable to present.

In general, "onigiri" (Japanese rice ball food), or a shaped rice food, is prepared by manually compressing a boiled rice into a desired shape, with suitable ingredients such as a pickled plum, a piece of salmon and a cod roe contained therein and lauer coated on the surface, as desired. In some cases, a boiled rice is housed in a mold of a desired shape and compressed for preparing "onigiri" of a desired shape. The resultant "onigiri" is not deformed if held in a hand in the eating step. It should be noted that the bonding strength among the rice grains serves to retain the shape of "onigiri" of the general type.

2. Description of the Prior Art

The taste and flavor of "onigiri" may be improved by adding suitable ingredients and soups to the boiled rice. But, the addition of an excessive amount of ingredients and soups weakens the bonding strength among the rice grains, failing to retain the shape of "onigiri" and resulting in restriction of the taste and flavor presented by "onigiri" of the general type.

There are various kinds of rice-based food including, for example, "tendon", or a bowl of rice topped with a fried prawn and the like, "unadon", or a bowl of rice topped with roasted eel, a chinese dish of fried rice, and curried rice. Either of these kinds of food presents its peculiar taste and flavor produced by the ingredients and soups disposed on the surface of the boiled rice. It is interesting to prepare a shaped rice food, or "onigiri" which presents the taste and flavor of the rice-based food mentioned above. However, it is impossible to prepare "onigiri" with a sufficient amount of, for example, soup added to the boiled rice. Naturally, the surfaces of the rice grains are covered with the soup if the soup is added in a sufficient amount, resulting in so much reduction in the bonding strength among the rice grains that it is impossible to prepare "onigiri" of a desired shape. It is possible to retain the required bonding strength among the rice grains if the amount of soup is suitably restricted. But, in this case, the resultant "onigiri" is incapable of presenting a desired taste and flavor.

SUMMARY OF THE INVENTION

An object of this invention is to provide a method of preparing a shaped rice food which can present various tastes and flavors and retain its original shape when held in the hand.

Another object is to provide a method of preparing a shaped rice food without directly utilizing the bonding strength among the grains of boiled rice.

A method of preparing a shaped rice food according to this invention comprises wrapping a boiled rice pretreated to be substantially non-viscous in a heat-shrinkable film in a desired shape, and heating the wrapped rice, thereby softening and swelling the rice and shrinking the film so as to compress the swelled rice by the shrinking force of the film.

It is preferred to freeze the boiled rice in a desired shape before wrapping in the heat-shrinkable film, as later described.

DESCRIPTION OF THE PREFERRED EMBODIMENTS

The starting material of rice used in this invention is prepared by boiling a polished rice with water in an ordinary manner, followed by treating the boiled rice to be substantially non-viscous. The expression "substantially non-viscous" denotes that the rice grains fail to be bonded together when compressed manually or within a mold. In other words, it is impossible to prepare a shaped rice, which retains its shape when held in a hand in the eating step, from the "substantially non-viscous" boiled rice. Incidentally, it is acceptable that some of the rice grains are bonded together when compressed manually or within a mold.

In general, a polished rice boiled with water contains about 60 to 65% by weight of water and is viscous enough to be bonded together. When various ingredients, soup and one or more kinds of liquid or fluid flavorings are added in a sufficient amount, the viscous boiled rice is rendered substantially non-viscous. Typical examples of the ingredients, flavorings and soups used in this invention include various kinds of fish and shellfish, eggs, meat, vegetables, refined sake, soy, sesame seeds, table salt, and soups of sukiyaki, "gyunabe", or beef cooked in Japanese style, "tendon", or a bowl of rice topped with fried prawn and the like, "gyudon", or a bowl of rice topped with cooked beef, "katsudon", or a bowl of rice topped with fried pork, "oyakodon", or a bowl of rice topped with cooked chicken and eggs, "unadon", or a bowl of rice topped with roasted eel, "chukadon" or a bowl of rice topped with a special chinese food, and curried rice. Many other additives known to the art may be used in this invention. As stated above, these ingredients or flavorings are added in an amount sufficient for rendering the boiled rice to be substantially non-viscous. It is of no difficulty to determine the actual added amount in view of the object of this invention, though the amount required for simply rendering the boiled rice substantially non-viscous differs depending on the kinds of ingredients or flavorings used. It is also possible to fry the boiled rice using an edible oil such as salad oil or sesame oil with or without suitable ingredients added to the boiled rice so as to render the boiled rice substantially non-viscous.

The substantially non-viscous rice thus obtained is wrapped in a heat-shrinkable film in a desired shape. The wrapping may be effected manually or mechanically. In the manual wrapping, a suitable amount of the treated rice is wrapped manually in a heat-shrinkable film of a suitable size and formed into a desired shape. On the other hand, the mechanical wrapping utilizes a mold having a plurality of concaves of a desired shape. The treated rice is housed in each of the concaves and, then, the mold is inverted so as to allow the treated rice housed therein to be disposed on a sheet of heat-shrinkable film. Finally, the sheet of heat-shrinkable film is cut off and each mass of treated rice is wrapped in the film thus cut off. Incidentally, the treated rice can be wrapped in this fashion in a desired shape such as triangular, square or circular in cross section.

It is convenient to utilize freezing in the wrapping step. In this case, the treated rice housed in the concave of a mold is allowed to stand under temperatures of, for example, −2° C. to −5° C. or lower. The rice thus frozen retains its shape when taken out of the concave and, consequently, facilitates wrapping in the heat-shrinkable film. The wrapping can be effected mechanically in an ordinary fashion. It should be noted that the heat-shrinkable film should preferably be brought into tight contact with the rice and the edge portions of the film should preferably be overlapped so as to fully utilize the shrinking force of the film in the subsequent step of heating the wrapped rice.

The heat-shrinkable film used in this invention should be shrinkable in the subsequent heating step and should be capable of exerting a sufficient shrinking force on the rice wrapped therein. It may be of no difficulty for those skilled in the art to select a suitable heat-shrinkable film meeting the above-noted requirements. In general, the film starts shrinking at about 50° to 60° C. and finishes shrinking at about 90° C., with about 15% to about 30% of area shrinkage. Polyvinylidene chloride provides a typical example of a heat-shrinkable film used in this invention and is available on the market under the trademark "KURE-WRAP", produced by Kureha Kagaku Kogyo K. K., Japan, and "SARAN-WRAP", produced by Asahi-Dow Chemical Co., Ltd., Japan.

The rice wrapped in a heat-shrinkable film can be stored in a frozen state under temperatures of −2° C. or lower and subjected to the subsequent heating step when desired.

When heated, the rice wrapped in a heat-shrinkable film is softened and swollen. The rice under this condition is imparted with an increased viscosity. At the same time, the film is caused to shrink. It follows that the shrinking force of the film is exerted on the swollen rice, resulting in mutual bonding of the rice grains so as to provide a shaped rice food, or "onigiri". The heating may be carried out by an ordinary steaming means or by using an electric heater such as an electronic oven. It suffices to heat the wrapped rice up to about 90° C., but no inconvenience is presented if the heating is carried out at higher temperatures, for example, at 100° to 120° C. The resultant "onigiri" is not deformed when held in a hand in the eating step.

As described in detail, the method of this invention permits preparing "onigiri" without directly utilizing or depending on the bonding strength among the grains of boiled rice. This makes it possible to add various ingredients, soups and flavorings to the boiled rice in such a large amount as to render the rice substantially non-viscous. It follows that this invention permits preparing a shaped rice food, or "onigiri", of desired taste and flavor.

EXAMPLE 1

Suitable amounts of scrambled eggs, sliced ham and leek cut into tiny pieces were fried with salad oil so as to prepare ingredients and mixed with a fried rice in an amount of 1.5 times as much by weight as the ingredients. Then, the mixture was frizzled with suitable amounts of soy, table salt and pepper added thereto so as to obtain a non-viscous frizzled rice.

The frizzled rice in an amount of 50 g was wrapped in a polyvinylidene chloride film 150 mm square and 12μ thick such that the edge portions of the film were overlapped. The wrapped rice was formed into a triangular shape in cross section and stored 24 hours in a refrigerator maintained at −5° C., followed by taking out the frozen rice from the refrigerator and heating it in an electronic oven for about 50 seconds. After the heating, the film was removed, obtaining "onigiri" which was not deformed when picked up by the fingers.

EXAMPLE 2

A soup presenting a flavor of beef was prepared first from a mixture of suitable amounts of minced beef, soy, refined sake, sugar and chemical seasonings. 8 G of soup thus prepared was added to 50 g of boiled rice disposed on a polyvinylidene chloride film 150 mm square and 12μ thick, immediately followed by wrapping in a manner to overlap the edge portions of the film and to form the wrapped rice into a triangular shape in cross section. The rice wrapped in this fashion was subjected to freezing and, then, to heating as in Example 1, obtaining a satisfactory "onigiri".

8 G of soup prepared above was added to 50 g of boiled rice disposed lightly, i.e., without compressing, in an "onigiri"-shaped container. The container was, then, stored for 24 hours in a refrigerator maintained at −5° C., followed by taking out the frozen rice from the container and wrapping it in a film equivalent to the polyvinylidene chloride film mentioned above in a manner to overlap the edge portions of the film. The rice wrapped in this fashion was stored in a refrigerator and, then, heated in an electronic oven. After the heating, the film was removed, obtaining "onigiri" which was not deformed when picked up by the fingers.

EXAMPLE 3

10 G of properly seasoned raw egg was fully stirred and uniformly poured over 50 g of boiled rice disposed on a polyvinylidene chloride film 150 mm square and 12μ thick. Then, the rice was wrapped in the film in a manner to overlap the edge portions of the film and formed into a circular shape in cross section. The rice wrapped in this fashion was frozen for 6 hours in a refrigerator maintained at −18° C. and, then, heated for 80 seconds in an electronic oven. The resultant hot "onigiri" was not deformed when picked up by the fingers.

Having described my invention, variations which do not depart from the spirit of the invention will become apparent to one skilled in the art. The above examples and specification are not intended to limit the invention.

What is claimed is:

1. A method of preparing a predetermined shaped rice food which shape is maintained when the shaped rice food is handled, said method comprising the following steps in the order named:
   (a) treating a predetermined amount of boiled rice grains with a predetermined amount of at least one ingredient to form a food mixture wherein the boiled rice grains change from a normally mutual viscous condition to a second nonviscous condition such that the bonding strength among said boiled rice grains in said treated food mixture is weakened to prevent the formation of a predetermined rice food shape when compressed;
   (b) disposing said treated food mixture in a container of predetermined shape;
   (c) freezing said treated food mixture disposed in said container of predetermined shape;
   (d) removing said frozen treated food mixture from said container of predetermined shape;
   (e) wrapping said treated food mixture in a predetermined shape heat-shrinkable film; and (f) heating said predetermined shape heat-shrinkable film wrapped frozen treated food mixture to soften and swell said boiled rice grains and shrink said predetermined shape heat-shrinkable film wrapped treated food mixture to compress said treated food mixture whereby said condition of said rice grains changes from said second nonviscous condition to said normally mutual viscous condition to form a predetermined shape heat-shrinkable film wrapped treated food mixture which maintains said predetermined shape when said film is removed and said shaped rice food is handled.

* * * * *